US011198363B1

(12) United States Patent
Jinnah

(10) Patent No.: US 11,198,363 B1
(45) Date of Patent: Dec. 14, 2021

(54) MOTORIZED MOBILE 'SMART' CART WITH VOICE ACTIVATION

(71) Applicant: Jeanita Jinnah, Lansing, MI (US)

(72) Inventor: Jeanita Jinnah, Lansing, MI (US)

( * ) Notice: Subject to any disclaimer, the term of this patent is extended or adjusted under 35 U.S.C. 154(b) by 0 days.

(21) Appl. No.: 15/350,231

(22) Filed: Nov. 14, 2016

(51) Int. Cl.
*B60P 3/34* (2006.01)
*B60K 31/00* (2006.01)
*B62B 5/00* (2006.01)
*B62B 3/02* (2006.01)
*H02J 7/00* (2006.01)
*B60L 53/16* (2019.01)
*B60L 53/18* (2019.01)

(52) U.S. Cl.
CPC ...... *B60K 31/0058* (2013.01); *B60K 31/0008* (2013.01); *B60L 53/16* (2019.02); *B62B 3/02* (2013.01); *B62B 5/0036* (2013.01); *B62B 5/0053* (2013.01); *B62B 5/0076* (2013.01); *H02J 7/0027* (2013.01); *B60L 53/18* (2019.02); *B60L 2240/24* (2013.01); *B60L 2240/32* (2013.01); *B60L 2250/30* (2013.01); *B60Y 2200/91* (2013.01); *B60Y 2300/0954* (2013.01); *B60Y 2400/112* (2013.01); *B60Y 2400/301* (2013.01); *B62B 2206/06* (2013.01)

(58) Field of Classification Search
CPC .......... B25J 11/008; B25J 9/0003; B60P 3/34
See application file for complete search history.

(56) References Cited

U.S. PATENT DOCUMENTS

| 4,047,599 A * | 9/1977 | Rousseau | H02G 11/02 191/12.2 A |
| 5,161,868 A * | 11/1992 | Hooser | A47B 19/04 312/223.4 |
| 6,196,001 B1 * | 3/2001 | Tannous | F25B 21/04 62/246 |
| 6,443,543 B1 * | 9/2002 | Chiang | A47B 21/00 180/65.1 |
| 9,720,414 B1 * | 8/2017 | Theobald | B25J 11/008 |
| 9,755,446 B2 * | 9/2017 | Schreiner | H02J 7/0044 |
| 2005/0216126 A1 * | 9/2005 | Koselka | B25J 9/0003 700/259 |
| 2010/0243344 A1 * | 9/2010 | Wyrobek | B25J 19/0016 180/21 |

* cited by examiner

Primary Examiner — Bryan A Evans

(57) ABSTRACT

A motorized, voice-activated 'smart' mobile workstation incorporating casters, a base support member, a work surface with height-adjustment feature, a power source for recharging electronic devices held on the mobile workstation, a power cord which plugs into an electrical wall outlet for recharging of mobile workstation, and a battery which extends the operation of the mobile workstation while the mobile workstation is not plugged into an electrical wall outlet. The mobile workstation further includes a motor which gives the mobile workstation rotational energy, smart technology which comprises a computerized 'brain' which helps humans communicate with the mobile workstation by giving simple voice commands, which control the directional and elevational movement of the mobile workstation. A remote control apparatus powers on and off the mobile workstation and is also an alternative means for controlling the directional and elevational movement of the mobile workstation. Further included are sensors which include collision avoidance capabilities.

18 Claims, 6 Drawing Sheets (Fig. 1A)
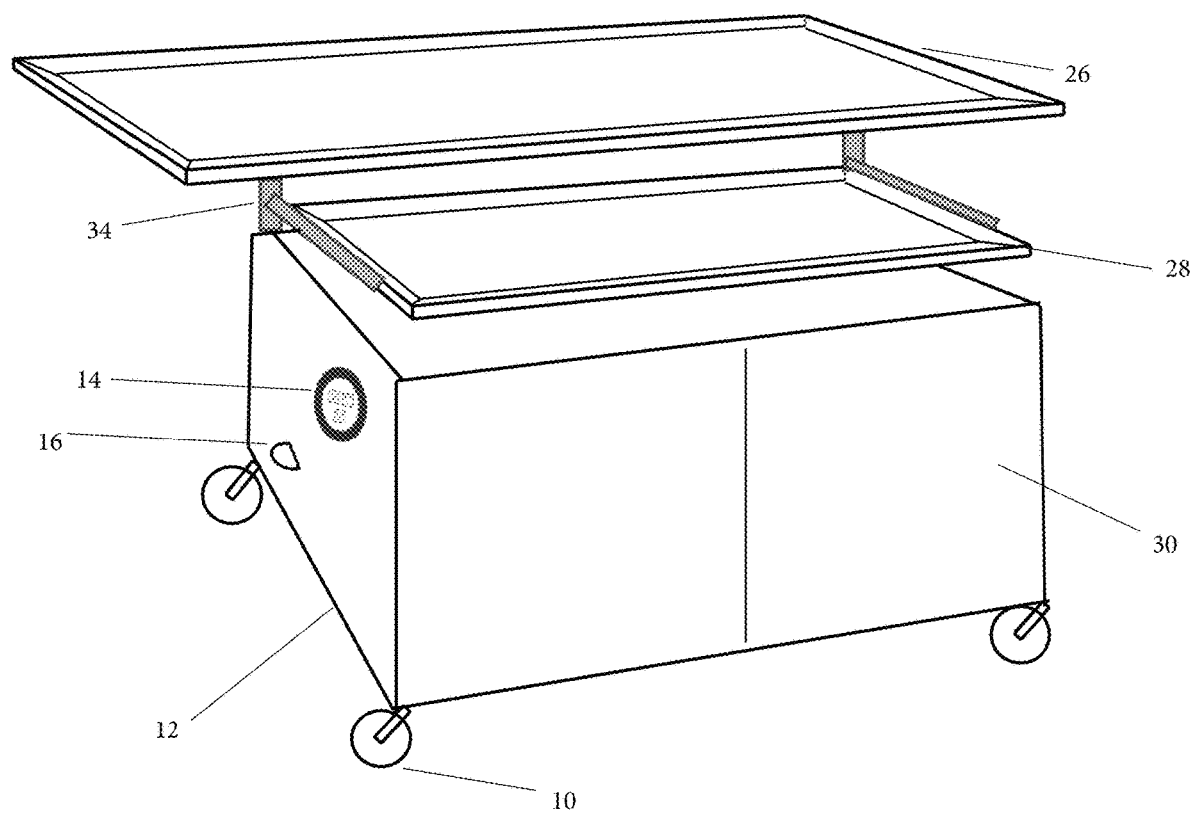

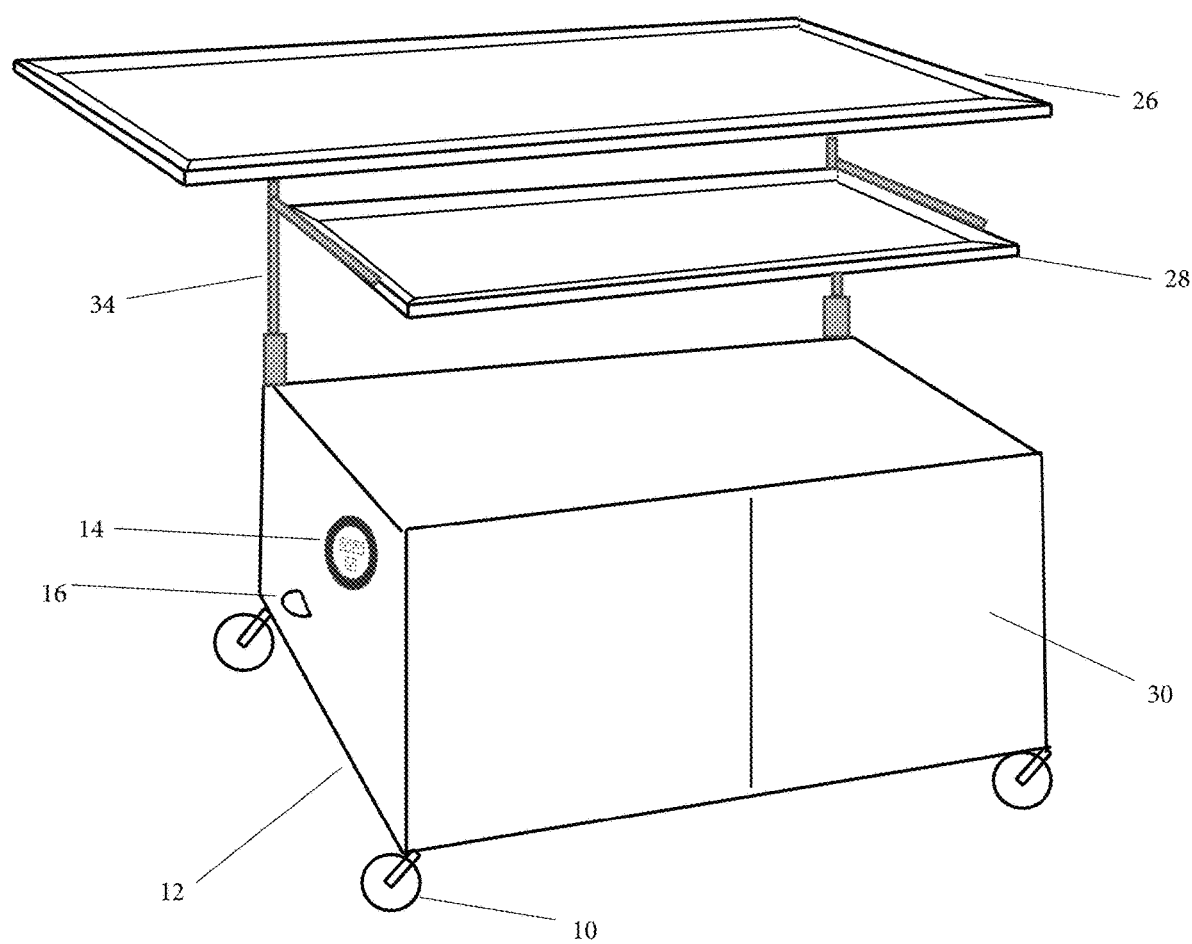
(Fig. 1B)

(Fig. 2A)
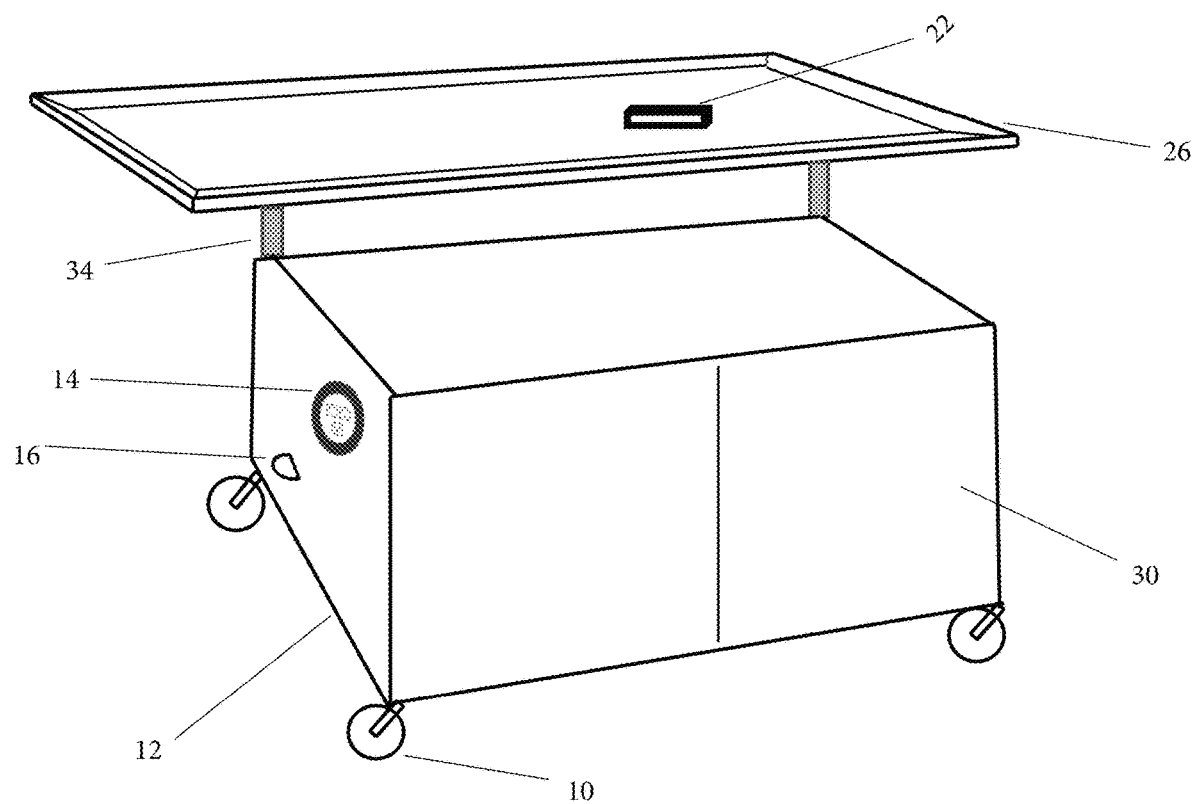

(Fig. 2B)
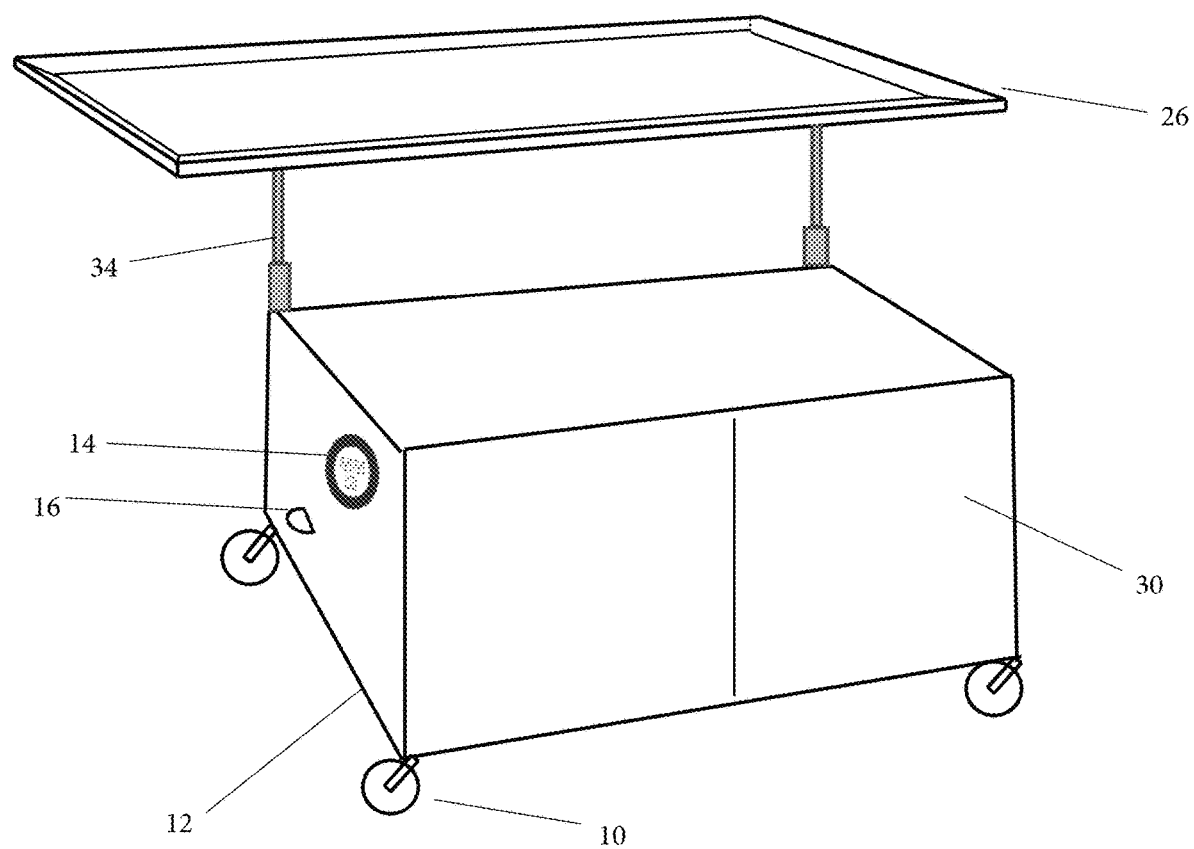

(Fig. 3)
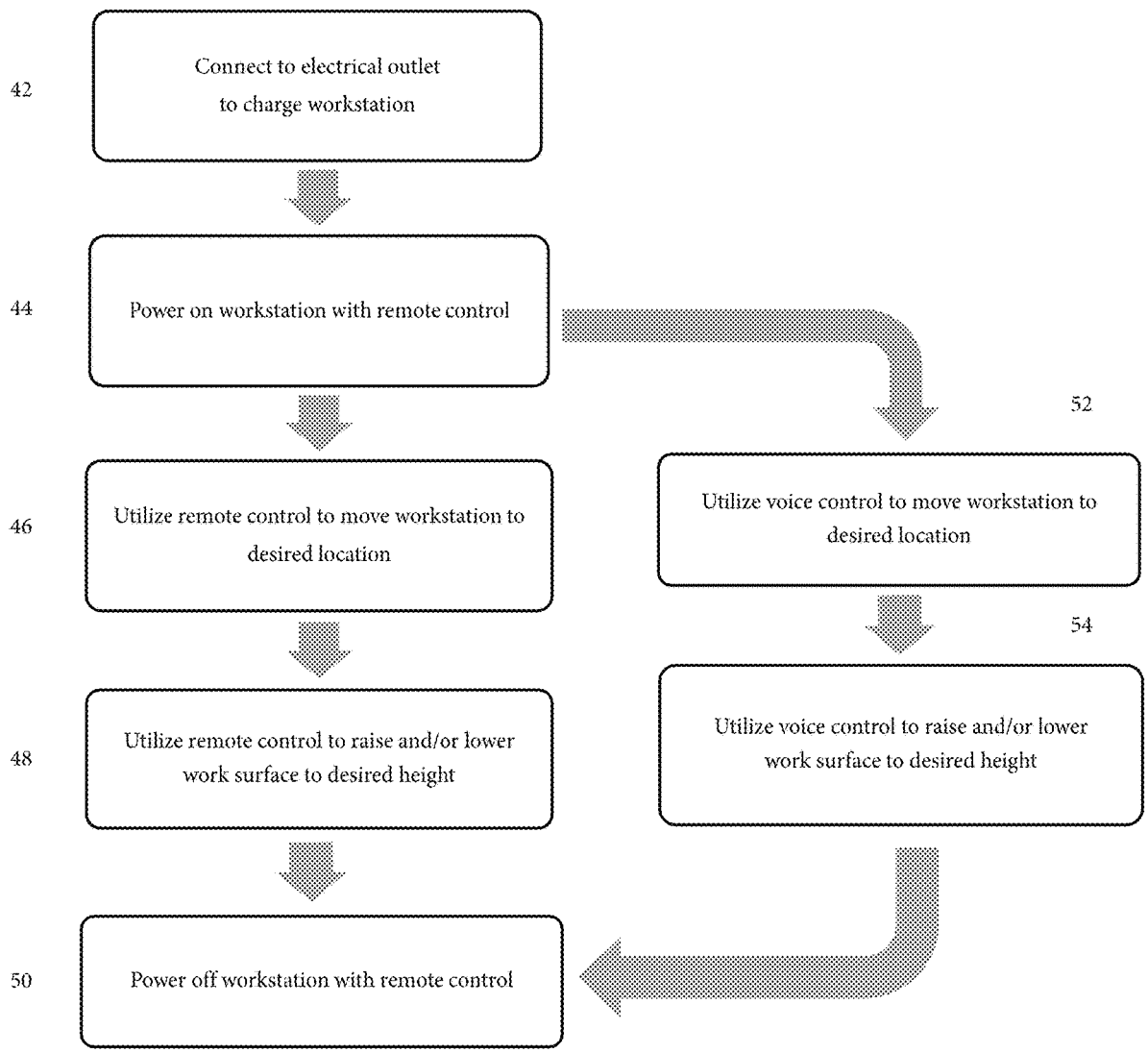
Block diagram of workstation operational concept (Fig. 4)
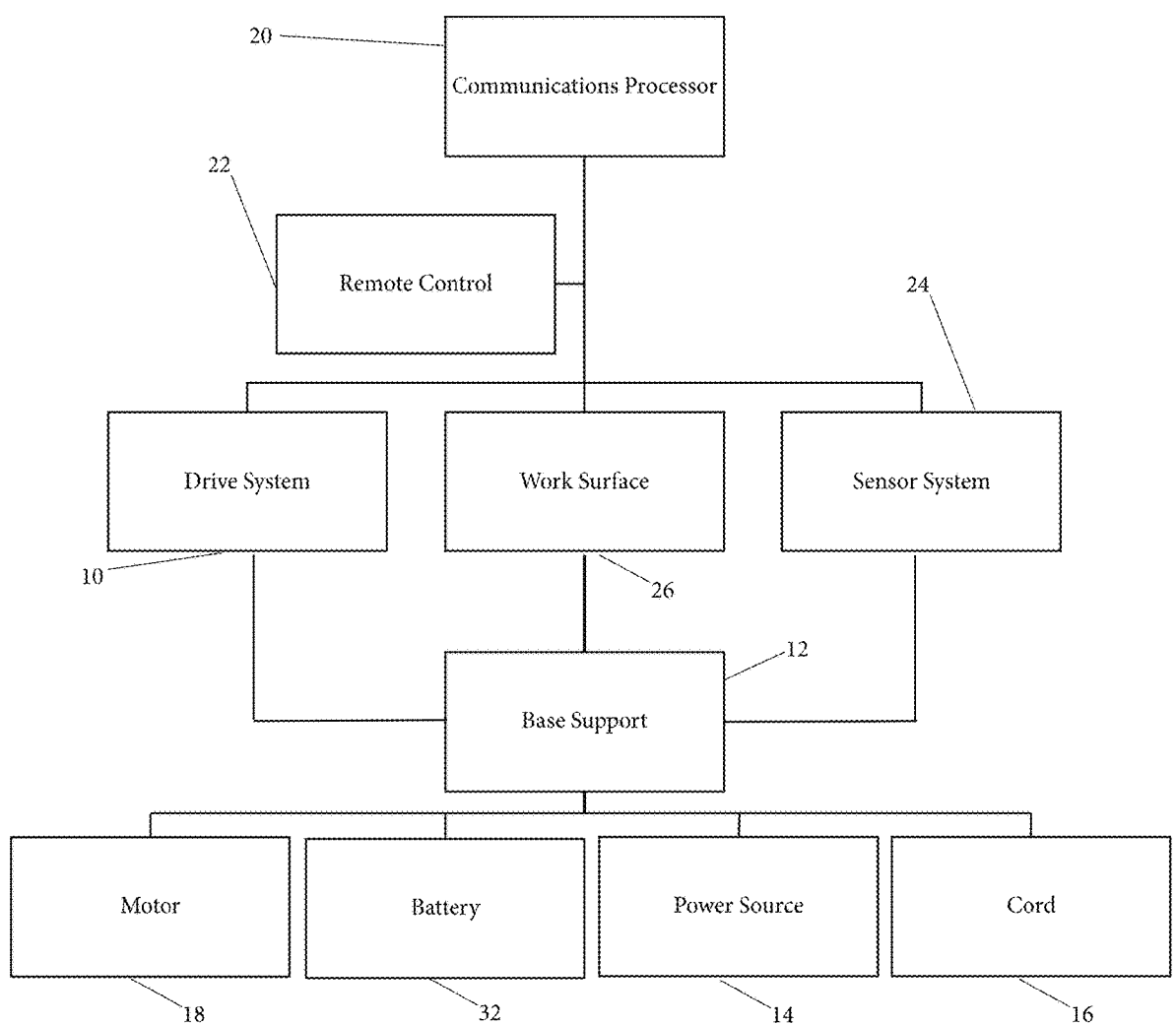
Block diagram of the mobile workstation

MOTORIZED MOBILE 'SMART' CART WITH VOICE ACTIVATION

CROSS REFERENCE TO RELATED APPLICATIONS

This application claims the benefit of provisional patent application 62/262,955, filed Dec. 4, 2015 by the present inventor.

FEDERALLY SPONSORED RESEARCH AND DEVELOPMENT

Not applicable

SEQUENCE LISTING OR PROGRAM

Not applicable

BACKGROUND

A Motorized Mobile 'Smart' Workstation with Voice Activation and Remote Control Capability That Provides a Work Surface For a Sitting/Standing Person which pertains to the field of mobile laptop carts, aka mobile workstations.

Mobile laptop carts are designed to meet the needs of busy people on the go. Traditionally, mobile laptop carts provide a work surface that is mobile (able to be moved from one place to another), eliminating the feeling of confinement that fixed or stationary workstations can sometimes cause.

However, these mobile laptop carts have some limitations and drawbacks. For example, in order to move the mobile laptop cart from one place to another one has to physically push or pull it, thus requiring the user to expend some energy in order to utilize its mobile feature, thereby making the cart hands-on.

Also, generally mobile laptop carts are often rather wobbly and at times unstable, with most having a narrow base, usually consisting of a single post, that supports the work surface of the mobile laptop cart. An unstable cart can be unpleasant to use and can jeopardize the safety of the electronic devices and items held thereon.

And although mobile laptop carts generally come with a height-adjustment feature, which gives the user the option of either sitting or standing, in order to utilize this feature the user usually has to turn a knob at the base of the cart to release the post on which the work surface rests, then raise or lower the work surface to the desired height, and then tighten the knob again so that the mobile laptop cart remains at the desired height. This usually requires the user to bend down to locate the knob at the base of the cart, and then, after giving the knob several turns to loosen, raise the work surface of the cart to the desired height and then turn the knob several more times to tighten it again.

Thus, there is quite a bit of physical manipulation required to use these various features of the mobile laptop cart, which may make it difficult for persons with physical limitations or physical disabilities to use.

Further, an otherwise mobile laptop cart becomes stationary when the user has to plug electronic devices being used on the cart into an electrical wall outlet for recharging, thus tethering the cart to the wall, significantly limiting the cart's range of motion.

Also, with mobile laptop carts there is generally no emotive bond or substantive interaction between the user and the cart other than the cold, non-emotional operation of an inanimate object being pushed or pulled by the user.

Speakers and presenters have long liked having the freedom to move around the room, or stage, while speaking in order to engage their audience in a more intimate way. This helps them connect with the audience, allowing them greater ability to capture the audience's attention when they are engaged in intimate conversation face-to-face.

But until this invention, the speaker/presenter would have to disengage the audience momentarily to walk back over to the speaker's podium, which is stationary, to check his or her notes or manipulate their PowerPoint presentation on their laptop computer to advance the slide. Such disengagement from a captive audience, however brief, can cause a crucial drop in the audience's attention span, or break the flow of the speaker's presentation or the audience's participation. This break in speaker-audience connectivity, and/or audience participation, can be crucial to, for example, a presenter making a sales presentation where capturing and keeping the audience's attention could be critical to making a sale or winning a multi-million dollar contract.

This invention, thus, solves a long-felt need for those needing greater control, flexibility, mobility, and autonomous hands-free operation of their mobile laptop cart. It solves the problem of audience disengagement from the speaker by making it possible for the speaker to discretely summon his or her mobile workstation over to where he or she is standing or sitting with voice command, or via remote control, to check his or her notes or perform some other task that the workstation is being utilized for in that moment.

SUMMARY

In accordance with one embodiment a Motorized Mobile 'Smart' Workstation with Voice Activation ("Cart") comprises casters or rollers that give the cart mobility, therewith the cart can be moved from one place to another place, or from one room to another room. A substantial base is affixed atop the casters or rollers that may provide for a more stable cart and for adequate support for the work surface therewith contained. Sensors are affixed strategically to the base of the cart so that when the cart is in motion the sensors are activated and can thus sense the presence of obstacles such as people, furniture, or a wall in the immediate vicinity of the moving cart, therewith causing the cart to make the necessary adjustments to maneuver around these objects to avoid hitting them. The sensors also prevent the cart from dropping off of a stair or a ledge. A motor is housed inside the base of the cart which produces rotational energy, powering the cart. A remote control apparatus as one means of operating the plurality of features of the cart, such as: elevational and directional movement, and for powering the cart on and off. Smart technology built into the cart which comprises the communications processor by which a human can speak a verbal command, thus controlling the plurality of features of the cart, such as: elevational and directional movement, thus making the cart voice activated. A power source built into the cart for recharging electronic devices held on the cart. A battery mounted in the base of the cart allows for uninterrupted operation of the cart for an extended period of time while the cart is not plugged into an electrical wall outlet. An electrical cord installed on the cart allows the cart to be plugged into an electrical wall outlet for recharging the battery. A height-adjustment feature which allows the cart to be used in either a sitting or a standing position. And a horizontal work surface which includes a lower pull-out work surface for holding electronic devices, books, notes, and such.

Advantages

Accordingly several advantages of one or more aspects are as follows:
a. hands-free operation, which minimizes physical exertion,
b. voice activation, whereby the user can operate the cart by speaking a simple voice command such as 'come' or 'stop', causing the cart to move in accordance with the voice command, or 'up' or 'down', whereby controlling the height-adjustment of the cart,
c. the substantial base on which the cart rests gives the cart increased stability, providing a more secure work surface,
d. the user has more than one means of utilizing the height-adjustment feature of the cart, namely the remote control apparatus, or by voice command wherewith the user speaks a simple command such as 'up' or 'down', thereby making this functionality hands-free. The 'smart' technology built into the cart receives and interprets such verbal command and responds accordingly,
e. the ability to move the cart from one place to another place, or from room to room, without the user having to physically push or pull the cart, by simply pushing a button on the remote control apparatus, or by speaking a simple voice command such as 'come' or 'stop', which is then intercepted by the 'smart' technology built into the cart, setting the cart in motion,
f. the sensors mounted strategically on the cart, which can detect objects such as people, furniture, or a wall while the cart is in motion, preventing the cart from running into these objects; the sensors also prevent the cart from dropping off of a stair or a ledge, thereby preventing damage to the cart,
g. the built-in power source which allows the user to recharge electronic devices held on the cart, thereby not limiting the mobility of the cart,
h. a lower shelf comprising a pull-out feature which provides an additional work surface for housing electronic devices and items on the cart,
i. the retractable electrical cord built into the cart which allows the user to plug the cart into an electrical wall outlet thereby recharging the cart,
j. adequate ventilation to reduce the risk of overheating,
k. additional storage in the base of the cart for storing items such as cables, batteries, electronic devices, etc.,
l. slip-resistant work surface which reduces the risk of electronic devices moving around on the cart, and
m. bumper padding which helps to reduce the risk of damage to walls or furniture or to the cart itself.

Further advantages of one or more of the aspects: The Motorized Mobile 'Smart' Workstation with Voice Activation allows for hands-free operation, minimizes physical exertion, senses the presence of objects and people in its path of motion, allows for one or more modes of operation of the plurality of features hence by voice activation or by use of the remote control apparatus. Provides multiple work surfaces, mobility, a height-adjustment feature which allows the user to sit or stand. Easy access to all electronic devices and other items housed thereon, recharging of electronic devices, recharging of the cart, and creates a bond between 'man and machine' when the human gives a simple voice command and the cart responds to the command in kind by utilizing an electronic 'brain', simulating an interaction like the one between two humans. Still further advantages of various aspects will become apparent from a consideration of the ensuing description and drawings.

DESCRIPTION OF THE DRAWINGS in the drawings, closely related figures have the same number but different alphabetic suffixes.

FIG. 1A shows a perspective view of a cart with two horizontal shelves (top and lower) with the cart being in a lowered, or sitting, position.

FIG. 1B shows a perspective view of a cart with two horizontal shelves (top and lower) with the cart being in an elevated, or standing, position.

FIG. 2A shows a perspective view of a cart with one horizontal shelf with the cart being in a lowered, or sitting, position.

FIG. 2B shows a perspective view of a cart with one horizontal shelf with the cart being in an elevated, or standing, position.

FIG. 3 shows a block diagram of how to operate the cart.

FIG. 4 shows a block diagram of the cart.

DRAWINGS—REFERENCE NUMERALS 10 casters or rollers
12 base
14 power source
16 cord
18 motor
20 communications processor
22 remote control
24 sensors
26 top shelf
28 lower shelf
30 door
30a door left
30b door right
32 battery
34 mounting member
36 latch
38 bumper pad
40 air-inlet passages

DETAILED DESCRIPTION—FIGS. 1A AND 1B—FIRST EMBODIMENT—PERSPECTIVE VIEW

In the following description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

One embodiment of the cart is illustrated in FIG. 1A (perspective view, two shelves, lowered) and FIG. 1B (perspective view, two shelves, elevated). The cart has casters or rollers 10, and a base 12 which rests on top of the casters or rollers 10. The casters or rollers 10 swivel, making it possible for the cart to change directions easily. The cart comprises a plurality of casters or rollers 10 so as to aid with stability of the cart, and are of a shape and size that enables the cart to successfully maneuver through a typical home or office environment and climb the thresholds of said typical environments. Each caster or roller 10 is propelled by an electric motor powered by a battery. Alternatively, the cart could be powered by a fuel cell or other means.

The base 12 completely encloses the lower part of the cart and has four sides, front, back, left, and right. The base 12 may be approximately the same width and length of the lower shelf 28. The figure shows a closed design, which hides most of the cart's inner workings. This represents a classic design which may appeal to certain groups. A more open design will give easier access to the cart's components and provide for additional storage space, and/or additional ventilation. The housing may be wood, plastic, metal or other appropriate materials. The basic design could be made to look like furniture to blend into a typical home, or made to look like office furniture to blend into any office or other commercial or business environment.

On the front of the base 12, in this embodiment, are two door panels 30 (one left, and one right), which open outward exposing the innards of the cart. The left door panel 30a opens to the left and the right door panel 30b opens to the right. The door panels 30 each have a single push latch 36 (not shown) which allows the user to open and close the doors 30 with a single push on the door 30. When the door panels 30 are open, revealing the inner workings of the cart, various items such as wiring/cords, a motor 18, and a communications processor 20 are revealed. The base 12 may also be used for additional storage of items such as batteries, additional electronic devices, etc.

The top shelf 26 is of a length and width that allows for adequate room to hold electronic devices such as a laptop computer, tablet computer, cellular phone, books and such, with the top shelf 26 being several inches longer and several inches wider than the lower shelf 28. The lower shelf 28 has a drop of several inches from the bottom of the top shelf 26 to allow for adequate storage space on the lower shelf 28 and to not impede the pull-out feature of the lower shelf 28. It will be apparent to an artisan of ordinary skill that the lower shelf 28 be of a smaller length and width than that of the top shelf 26 in order for the lower shelf 28 to fit snugly under the top shelf 26, and that there be an adequate drop between the underside of the top shelf 26 and the top of the lower shelf 28 to house certain items of choice by the user. Should the market desire more room to house larger items on the lower shelf 28 then the drop between the underside of the top shelf 26 and the top of the lower shelf 28 would be significantly larger as appropriately needed.

At its elevated position the cart may be raised to a height of approximately 40½ inches and lowered to a height of approximately 26½ inches. This is the preferred embodiment. However, the cart may take on several alternate embodiments. For example, the base 12 may consist of only one door panel 30 which opens either to the left or to the right (not pictured here). The cart may also have only one shelf 26, which is shown in an alternative embodiment. And the cart's elevated position and lowered position may be slightly lower or higher, as needed. The base 12 configuration may take on various shapes and sizes to change the look and feel of the cart, and to meet the market demand. For example, in one embodiment the base 12 may be longer in height with a shorter width. The base 12 may also be configured to look oval shape, or round, or any other shape. The work surface may also be configured to be a shorter width and/or narrower to make the workstation more compact in order to easily maneuver through more narrow and compact spaces, and to fit seamlessly into any environment.

Affixed to the left side of the base 12 in this preferred embodiment is a power source 14. However, the power source 14 may take on various embodiments so as to allow for proper recharging of electronic devices, and may be incorporated into any component of the cart. For example, a power grommet, pop-up power grommet, or hidden wireless charging, or any such charging mechanism that adds connectivity to the cart. Several commercially available power grommets may be incorporated into the cart to provide a source of power for devices, such as: ApexDesk UL Certified Power Grommet: WireRun Bonito Power Grommet; Pop-up Power Module by NDI Office Furniture. The cart may also incorporate a charging pad, charging mat, or charging station, or any such options. The power source 14 may generally be incorporated into any component of the cart, as the market demands, and fit snugly into a pre-cut hole in the cart. The power source 14 may include, in any combination, and quantity, an AC power outlet, USB port, data port, telephone port, HDMI port, or any such connectivity option as the user desires.

Also affixed to the left side of the base 12 is a retractable electrical cord 16. The retractable electrical cord 16 allows the cord 16 to be retracted back into the base 12 so as to neatly secure it. However, in other embodiments the power source 14 and the electrical cord 16 may be affixed to the right side of the cart, or to the back of the cart, or the cart may also provide for a home base docking station which may be placed around the home or room, or any such charging stations.

Please note that while the cord 16 may be depicted as retractable the cord 16 may take on other embodiments such as, cord reel, cord wrap, or cord strap or any such item to secure the cord 16.

Sensors 24 are strategically affixed to the base 12. The sensors 24 are able to sense the presence of objects such as people, furniture, or a wall, determine their proximity to the cart, and can also detect a change in surface such as a stair or a ledge. Please note that while the sensors 24 are depicted as being generally incorporated into the base 12, it is understood that the sensors 24 may be incorporated into any component of the cart. Sensors 24 are generally known in the field to survey the environment in which, in this case, the mobile workstation is operating and report back information about the workstation's surroundings. To accomplish this, the sensors 24 may send out a laser beam to survey the environment surrounding the mobile workstation, measuring distance of objects and people around it, monitoring their movements, and reporting back to the mobile workstation the data it has collected, and adjusting its actions based on the collected data. This makes it possible for the mobile workstation to travel safely in its environment while avoiding collisions and other mishaps. The mobile workstation may be equipped with a plurality of sensors 24, which may be incorporated into any component of the cart. Examples of sensors 24 include, but are not limited to, a proximity sensor, a global positioning system (GPS), an infrared system, a laser system, a radar system, sonar, lidar, optical, and a radio transceiver.

A motor 18 of significant means propels the cart. Examples of motors 18 include, but are not limited to, a servo, stepper, or DC motor. And a communications processor 20, such as an Intel® Edison or Intel® Galileo development board, or any such development board is housed inside the base 12, and is programmed to operate all the features and elements of the cart. The reader may be acquainted with how the human brain works. The human brain performs a number of tasks for the human body such as physical movement, i.e. walking, talking, sitting, standing. The brain also controls the heart rate and breathing, body temperature, and blood pressure, to name a few. It also controls certain sensory sensations such as hearing, smelling, tasting, touching, and seeing. The human brain is made up of billions of nerve cells, called Neurons. These nerve cells have the ability to gather and transmit signals to control the various functions of the human body. The human body is naturally hard-wired to operate in such a way. The communications processor 20 is programmatically configured to control certain functions and sensory responses of the cart. It is connectively adapted to various elements of the cart to trigger action and to control the movements of the cart in response to human interaction and control. The battery 32, which is also housed inside the base 12, extends the life of the functionality of the cart for an extended period of time while the cart is not plugged into an electrical wall outlet.

Air-inlet passages 40 (not shown), generally located somewhere at the base 12, may allow air from outside of the cart to be drawn into the base 12 to facilitate air flow and heat venting, which prevents the cart from overheating.

A remote control apparatus 22, which comes with the cart, allows the user to power on and off the cart and to operate the plurality of features of the cart, such as its elevational and directional movement. Depending on the environment or circumstances the user may choose to utilize the remote control 22 to operate the cart's many features, or in other cases utilize the cart's voice command features.

There are two horizontal work surfaces in this preferred embodiment, a top shelf 26 and a lower shelf 28, that sit atop the base 12, which are attached to mounting member 34. The lower shelf 28 pulls out to allow easy access to its work surface. As previously stated, an alternative embodiment could have only one shelf 26. There may be a plurality of mounting members 34 at the back of the cart which also comprise a member for adjusting the height of the work surface. The mounting member 34 is comprised of a material suitable for securing the top shelf 26 and the lower shelf 28 to the mounting member 34, and for securing the mounting member 34 to the base 12. However, please note that while the mounting member 34 is depicted on the back of the cart it is understood that the mounting member 34 may be incorporated onto any side or component of the cart in order to properly secure the work surface to the cart.

The two work surfaces are treated with a chemical agent which helps to make the surfaces slip-resistant, thereby reducing the likelihood of electronic devices moving around on the cart. The agent may comprise an additive which is commercially available such as Rust-Oleum® Anti-Skid Additive which is an aluminum oxide grit that is mixed in with the coating material, which may comprise epoxy, latex, paint, stain or sealer, or any such appropriately designated coating material. The addition of the additive produces a "rough" or textured surface that makes the surface slip-resistant. The amount of the additive to mix in with the coating material is commiserate with the size of the surface being treated, and the desired amount of "roughness" or texture desired based on the markers preference in regard to look and feel of the work surface. To apply the agent, mix the desired amount of additive in with the coating material and apply the combined mixture to the prepared work surface. This step may be repeated several times, as needed, to ensure even coating of the work surface.

Another embodiment for slip-resistant work surface may comprise of commercially available Rust-Oleum® Truck Bed Coating which is available in spray paint or paint form. To apply to the work surface, spray or paint the Rust-Oleum® Truck Bed Coating on to the prepared work surface then immediately apply the coating material (i.e. paint, stain or sealer, etc.) to the work surface until achieving the desired amount of "roughness" or texture desired for the work surface. This step may be repeated several times, as needed, to ensure even coating of the work surface.

In another embodiment, a slip-resistant work surface may comprise of mixing any combination of the aforementioned commercially available products, such as the Rust-Oleum® Truck Bed Coating along with the Rust-Oleum® Anti-Skid Additive together to treat the work surface. In this embodiment, you may spray or paint the Rust-Oleum® Truck Bed Coating on to the prepared surface, then apply the Rust-Oleum® Anti-Skid Additive, mixed together with your desired coating material, to the work surface in the amount necessary to achieve the desired look and feel for the work surface. This step may be repeated several times, as needed, to ensure even coating of the work surface.

However, please note that the slip-resistant work surface may incorporate any other chemical agents, mixtures, components, either commercially available or organically manufactured, to safely secure and transport items held on work surface.

The work surfaces may also comprise of a safety edge stopper to reduce the chance of items moving around on the cart.

Bumper padding 38 (not shown) is strategically placed around the cart which helps minimize damage to furniture, walls and to the cart itself. The padding 38 may consist of any material, and may be incorporated either partially or totally around the perimeter of the cart. Even though the cart is configured to be operated hands-free, it is still possible for an adult or a child to physically push the cart to move it around the room. In the event this happens, the bumper padding 38 serves as a buffer between any object that the cart may come in contact with.

Operation

To operate the cart the user connects the workstation to an electrical circuit for charging 42, then uses the remote control apparatus 22 to power on 44 and off 50 the Motorized Mobile 'Smart' Workstation with Voice Activation. Once the cart has been powered on the user may choose to use the cart in its sitting position or in its standing position. To raise or lower the cart the user may use the buttons 48 on the remote control apparatus 22, or speak a simple verbal command such as 'up' or 'down' to which the communications processor 20 translates the verbal command into a computer-translatable signal and thereby responds by raising or lowering the work surface of the cart 54.

The cart may be moved from one location to another location by using the buttons 46 on the remote control apparatus 22, or the user may speak a simple verbal command such as 'come', or 'stop' 52. When the user speaks the verbal command the communications processor 20 is programmed to interpret the verbal command and convert it into a computer-translatable signal, causing the cart to move in accordance to the command, and in the direction of the person speaking the command, while clearing objects and maneuvering away from obstacles such as people, furniture, and a wall in its path of motion. The communications processor 20 is configured in such a way, together with the sensors 24, to trigger an avoidance mechanism which helps the cart to maneuver around obstacles and people, thereby finding the best route in response to the verbal command.

The communications processor 20 is also connectively configured, together with the sensors 24, to detect proximity, space, and a change in surface thereby preventing the cart from dropping off of a stair or a ledge.

When the cart is in motion this triggers the sensors 24, which sense the presence of obstacles or people in the immediate vicinity of the moving cart. The sensors 24 are configured in such a way to facilitate 'communication' with the communications processor 20, causing the cart to change directions as needed in order to maneuver around the obstacles to avoid hitting them.

The multiple work surfaces in this embodiment may be used to hold electronic devices such as a laptop computer, a tablet computer, a cellular phone, notes, books, or the such. The user may use only the top shelf 26 or utilize both the top shelf 26 and the lower shelf 28, thus the lower shelf 28 may be pulled out to allow access to its surface.

There are a variety of usages for the cart such as, a mobile lectern or work surface for a user who is reading, speaking, or teaching and such. The cart may be elevated to accommodate a standing person, with the work surfaces, top shelf 26 and/or lower shelf 28 used to hold notes, books, etc. The user may leave the cart in a stationary position or move it around the room as needed. There are also a variety of settings in which the cart may be utilized such as, a healthcare environment, classroom/lecture, office, or boardroom. Other settings may include personal use for watching movies or video gaming on a laptop computer. Or the cart may be utilized by writers/authors to alleviate some of the fatigue of sitting for extended periods of time. Libraries may also utilize the cart for working within the stacks, and inventory control. There may also be other settings and usages not mentioned here.

ALTERNATIVE EMBODIMENTS—FIGS. 2A AND 2B—PERSPECTIVE VIEW

In this embodiment FIGS. 2A and 2B show the perspective view of a cart with only one work surface. In FIG. 2A the cart is resting in a lowered, or sitting, position. And in FIG. 2B the cart is resting in an elevated, or standing, position.

Operation

This embodiment is operated in a similar manner as described above.
Block Diagram—FIG. 3
FIG. 3 is a block diagram showing how to operate the cart.
Block Diagram—FIG. 4
FIG. 3 is a block diagram showing the cart.

CONCLUSION, RAMIFICATIONS, AND SCOPE

Accordingly, the reader will see that the Motorized Mobile 'Smart' Workstation with Voice Activation of the various embodiments provides a mobile work surface, can be used in either a lowered or an elevated position, offers hands-free operation, is voice-activated or can be operated by a remote control apparatus, minimizes physical exertion by the user, provides a power source for recharging of electronic devices, has an electrical cord that plugs into an electrical wall outlet to recharge the cart, has a motor which propels the cart, and has a computerized 'brain' by which a human can communicate with the cart by speaking simple verbal commands. Further, the cart has sensors which can sense the presence of obstacles in the immediate vicinity when the cart is in motion, which triggers an avoidance mechanism causing the cart to maneuver around these obstacles, such as people, furniture, and walls. The sensors also detect proximity and space and a change in surface to prevent the cart from dropping off of a stair or a ledge.

While the above description contains many specificities, these should not be construed as limiting the scope of the embodiments but as merely providing illustrations of some of several embodiments. Many other variations are possible. For example, other embodiments such as a motorized cart with no computerized 'brain,' thereby operated by use of a hand-held remote control apparatus. Another embodiment may have a remote control switch attached directly to the cart which allows the user to control the directional and elevational movements of the cart with this switch. Yet another embodiment may have a single, or multiple, work surface(s) with no height-adjustment feature whereby the user utilizes the cart in a sitting position. The base of the cart may be partially enclosed instead of fully enclosed. And yet another embodiment may have no sensors, and no power source.

Thus the scope of the embodiments should be determined by the appended claims and their legal equivalents, rather than by the examples given.

What is claimed is:

1. A motorized mobile smart workstation, comprising:
(a) a base support member;
(b) a plurality of wheels coupled to said base support member and configured to controllably navigate floors and surfaces;
(c) a motor coupled with said base support member configured to give said workstation mobility;
(d) a communications processor configured to aid human interaction with said workstation;
(e) a work surface connected to said base support member;
(f) a mounting member coupled with said base support member configured to support and adjust the height of said work surface.

2. The apparatus of claim 1 wherein said communications processor is configured to autonomously control the movement of said workstation via voice command when a person speaks a verbal command or alternatively via remote control whereby transporting items held on said workstation.

3. The apparatus of claim 1 wherein said communications processor is configured to autonomously adjust the height of said work surface via voice command by a person or alternatively via remote control to accommodate a standing/sitting said person.

4. The apparatus of claim 1 further comprising:
a member for recharging electronic devices held on said workstation.

5. The apparatus of claim 1 further comprising:
sensors coupled with said communications processor and configured to alert said workstation when obstacles or people are in the vicinity to avoid a collision when said workstation is in motion.

6. The apparatus of claim 1 further comprising:
a remote control which provides an alternative means of operating plurality of features of said workstation.

7. The apparatus of claim 1 further comprising:
a storage compartment in said base support member with said base support member providing an enclosure comprising side and back panels and two front panel doors which open and close.

8. The apparatus of claim 1 further comprising:

air flow circulation and heat ventilation in said base support member.

9. The apparatus of claim 1 further comprising:

bumper padding coupled with said base support member to prevent damage to wall or furniture.

10. The apparatus of claim 1 further comprising:

the work surface comprising a slip-resistant work surface for keeping items on said work surface from moving around when said workstation is in motion.

11. The apparatus of claim 1 further comprising:

a motor-driven mobile workstation.

12. The apparatus of claim 1 further comprising:

a voice-activated mobile workstation.

13. The apparatus of claim 1 further comprising:

a remote-controlled mobile workstation.

14. The apparatus of claim 1 further comprising:

a computer interface coupled with said mobile workstation configured to control a plurality of features of said workstation and work collaboratively with components of said workstation.

15. The apparatus of claim 1 further comprising:

a remote control configured to control the movement of said workstation, adjust the height of said work surface, and power on and off said workstation.

16. The apparatus of claim 1 further comprising:

the base support member being substantially heavier than said mounting members, said horizontal adjustment feature, and said work surface.

17. The apparatus of claim 1 further comprising:

the work surface of substantial size to hold and transport a laptop computer, a tablet, a smartphone, books, notes, or other such items and comfortably navigate its environment.

18. The apparatus of claim 1 further comprising:

the work surface configured to elevate and lower via voice command or alternatively via remote control to accommodate a standing or sitting person.

* * * * *